H. R. GEER.
UNIVERSAL COUPLING.
APPLICATION FILED FEB. 14, 1920.
1,357,553. Patented Nov. 2, 1920.
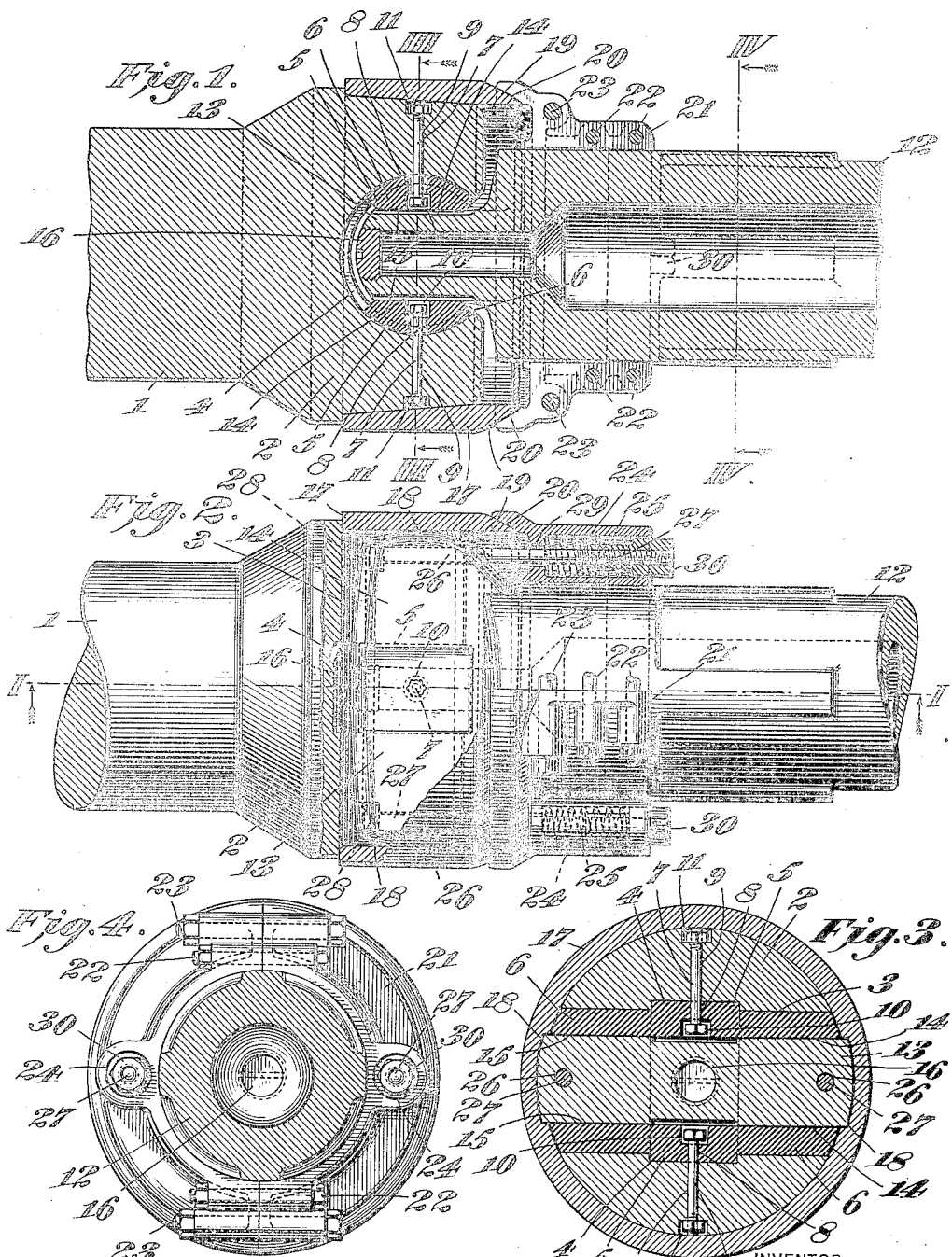

UNITED STATES PATENT OFFICE.

HARRY R. GEER, OF JOHNSTOWN, PENNSYLVANIA.

UNIVERSAL COUPLING.

1,357,553.  Specification of Letters Patent.  Patented Nov. 2, 1920.

Application filed February 14, 1920. Serial No. 358,785.

*To all whom it may concern:*

Be it known that I, HARRY R. GEER, a citizen of the United States, and a resident of the city of Johnstown, county of Cambria, and State of Pennsylvania, have invented certain new and useful Improvements in Universal Couplings; and I do hereby declare the following to be a full, clear, and exact description of the invention, such as will enable others skilled in the art to which it appertains to make and use the same.

My invention relates to improvements in universal couplings for connecting shafts which are not always in alinement, such couplings being particularly well adapted for use in rolling mills where provision for adjustment of the rolls and therefore considerable flexibility must exist. Furthermore it is essential to the life of the coupling that some provision be made for good and sufficient lubrication of, and the exclusion of extraneous matter, dust, etc., from the wearing parts. It is also necessary in the adaptation of universal couplings to rolling mills, particularly where reversal of the rolls takes place, that a minimum of lost motion and therefore a certain rigidity be inherent in the coupling itself. Noiseless operation is also desirable.

Lack of following, or insufficient provision for, the above principles has heretofore made the application of universal couplings to rolling mills a more or less questionable proposition, and I propose to remedy the matter by the attainment of the following objects:

First: to provide a universal coupling which has great flexibility because of the oscillatory and translatory motion it can have when transmitting rotary motion from a driving shaft to a driven shaft.

Second: to provide a strong, durable, noiseless and economical universal coupling of the necessary rigidity and consequent freedom from lost motion and with the minimum of wearing parts which are amply sufficient and yet simple and relatively economical to replace.

Third: to provide a universal coupling with means wherewith to insure the proper lubrication of the wearing parts and to exclude all extraneous matter therefrom.

Fourth: to provide a universal coupling relatively simple in construction and readily assembled or disassembled.

To fully accomplish the above objects with the minimum number of parts and simplicity of construction, it becomes necessary for various elements to serve dual purposes, as will hereinafter be fully explained. My invention as herein shown and described, is particularly adapted to rolling mills of large and heavy construction, but it is not intended to be so limited or defined, as it may be used in other connections where rotary motion is to be transmitted from one shaft to another.

My invention comprises a spindle with transverse end projections more or less rounded in form and having two parallel centrally recessed plane faces. The end projections are adapted to a sliding fit between a pair of slippers housed in a transverse cylindrical recess in the preferably enlarged coupling heads of the driving shaft and the driven shaft. This sliding pivot construction permits of the oscillation of the spindle and also provides, within the usual working limits, for the difference in alinement between the driving and driven shafts; i. e., for a slight change in distance between the coupling heads of said shafts, the end projections of the spindle slide between the slippers to compensate for said change. At the same time the construction is such as to prevent lost motion and also provides for noiseless operation.

Coupling sleeves are provided which fit over the coupling heads of the driving shaft and driven shaft and act to maintain the assembly and also form convenient lubricant chambers. The last feature would be useless, however, if it were not for my improved lubricant retaining, dirt and dust excluding device.

This device comprises the use of the spindle as a strut or distance piece and a set of springs so arranged that a segmental collar which is slidably mounted on the preferably enlarged head of the spindle and has an outwardly extending lip or flange with a spherical inner surface, is held in close sliding contact with the corresponding spherically faced outer edge of the coupling sleeve. The segmental collar thus forms the male end and the coupling sleeve the female end of a ball and socket joint. The segmental collar, thus acting as a yielding member, and the coupling sleeve jointly serve to center the spindle end in the coupling head and to form closed lubricant, dirt excluding, dust proof covers for the working members of the universal joint.

Having thus given a general description of my invention, I will now, in order to make the matter more clear, refer to the annexed sheet of drawings which forms part of this specification and in which like characters refer to like parts.

In the drawings I have shown but one end of the spindle as connected to the coupling head of a shaft, which may be either the driving or the driven shaft. It is to be distinctly understood, however, that the construction at the other end of the spindle is similar to that shown.

Figure 1 is a longitudinal section of my improved universal coupling taken on the line I—I of Fig. 2, showing the arrangement of the parts of the coupling.

Fig. 2 is a side elevation with the coupling head, coupling sleeve and segmental collar partly cut away showing the coupling in part elevation and section, the coupling being revolved a quarter turn from its position in Fig. 1.

Fig. 3 is a transverse section on the line III—III of Fig. 1, showing the arrangement of the slippers, the end of the spindle and the coupling sleeve.

Fig. 4 is a transverse section on the line IV—IV of Fig. 1, showing the spindle in section and the segmental collar in elevation.

Referring now to the various characters of reference on the drawings:—1 represents the neck of either a fixed or an adjustable driven shaft or driving shaft, the preferably enlarged coupling head 2 of which contains the transverse cylindrical recess 3. The cylindrical recess 3 has a central groove 4 adapted to receive a corresponding projection 5 on the back of the slippers 6. The bolts 7 passing through the slots 8 in the slippers 6 and the holes 9 in the bifurcated end of the coupling head 2 are provided for assembling purposes. The heads of the bolts 7 set in the enlarged central recesses 10 in the slippers 6 and the nuts in the enlarged recesses 11 in the outer surface of the coupling head 2.

The spindle 12 has on each end the transverse end projection 13 having the two centrally recessed, parallel, plane faces 14, which are adapted for sliding contact with and bearing against the plane face 15 of the slippers 6. If the spindle is hollow, as shown, I provide a plug 16 to close the end of the hollow to prevent lubricant flowing therein.

The coupling head 2 is provided with a close fitting coupling sleeve 17 which has the clearance recesses 18 to allow for the oscillation of the spindle 12. The outer edge 19 of the coupling sleeve 17 is preferably spherical and adapted for a close sliding fit with the interior spherical face 20 of the outwardly extending flange on the segmental collar 21.

The segmental collar 21, as shown, comprises two halves or parts, fastened together over and having a close sliding fit on the preferably enlarged heads of the spindle 12. The parts of the segmental collar 21 are held together by the four bolts 22 and the two bolts 23. In each half of the segmental collar 21 there is formed a cylindrical chamber 24, which contains a spring 25. In assembling, the cylindrical chambers 24 are lined up with the two longitudinal holes 26 in and near the ends of the transverse end projection 13 of the coupling spindle 12. Through the holes 26 pass the bolts 27 whose heads set in the enlarged recesses 28 in the transverse end projections 13 of the coupling spindle 12, thence the bolts pass through the enlarged holes 29 in the segmental collar 21 and through the springs 25 and then engage the spring locked nuts 30. The spring locked nuts 30 are adapted for adjusting the compression of the helical springs 25 so as to insure the proper fit between the spherical outer edge 19 of the coupling sleeve 17 and the corresponding spherical face 20 on the interior of the outwardly extending flange of the segmental collar 21. By this means and the close sliding fit, which the segmental collar 21 has on the enlarged end of the coupling spindle 12, a lubricant retaining and dust and dirt excluding coupling is assured.

It is thus evident that the universal joints I employ are of a telescoping type, the spindle ends forming the male part of the universal coupling and the center of rotation of the coupling can thus be variable to suit varying angularities. It is not uncommon to employ dust proof lubricant retainers on fixed center couplings where telescopic shafts are employed, but where these are used they are not the elements which hold the coupling nuts in working relation, nor is the spindle or shaft thus employed.

Furthermore, it is evident from the nature of the construction that my improved universal shaft coupling has the necessary flexibility for the work required and is at the same time of such rigid construction as to eliminate lost motion, all of which tends to noiseless operation. Also my universal shaft coupling is readily assembled or disassembled for inspection or renewal of the wearing parts which are amply sufficient and yet simple and relatively economical to replace. It is also evident that with my improved device for retaining lubricant and excluding dirt, dust, etc., that a longer life is assured the coupling and in particular to those parts which receive the greatest wear.

All this is accomplished with the minimum number of parts and simplicity of construction by making several elements serve dual purposes, as herein described.

Although I have shown and described my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. In a universal coupling, an endwise movable spindle, coupling sleeves, segmental collars abutting said coupling sleeves and springs adapted to co-act with said spindle, said coupling sleeves and said segmental collars, thereby holding said spindle in endwise equilibrium.

2. In a universal coupling, an endwise movable spindle, coupling sleeves, segmental collars abutting said coupling sleeves and compression springs adapted to co-act with said spindle, coupling sleeves and segmental collars, thereby maintaining sliding contact between said coupling sleeves and segmental collars, whereby said spindle is held in endwise equilibrium.

3. In a universal coupling, an endwise movable spindle, coupling sleeves, segmental collars abutting said coupling sleeves and helical springs adapted to co-act with said spindle, coupling sleeves and segmental collars thereby causing said segmental collars to slidably engage said coupling sleeves, to hold said spindle in endwise equilibrium and to form with said coupling sleeves dust proof lubricant retaining covers for the working members of the universal coupling.

4. In a universal coupling, an endwise movable spindle, coupling sleeves, segmental collars slidably mounted on said spindle and helical springs adapted to co-act with said spindle, coupling sleeves and segmental collars whereby said segmental collars slidably engage said coupling sleeves to hold said spindle in endwise equilibrium and form with said coupling sleeves, dust proof lubricant retaining covers for the working members of the universal coupling.

5. In a universal coupling, a driving rotating element, a driven rotating element, an endwise movable spindle adapted to telescopically engage said rotating elements, coupling sleeves, segmental collars abutting said coupling sleeves and springs adapted to co-act with said spindle, coupling sleeves and segmental collars whereby said spindle is held in endwise equilibrium and whereby said segmental collars together with said coupling sleeves form dust proof lubricant retaining covers for the working members of the universal coupling.

6. In a universal coupling, an endwise movable spindle adapted to slidably engage a bifurcated coupling head, a coupling sleeve for said coupling head, a segmental collar slidably mounted on said spindle and abutting said coupling sleeve and springs adapted to co-act with said spindle, coupling sleeve and segmental collar to endwise center said spindle and to cause said segmental collar to slidably engage said coupling sleeve and thereby form a dust proof, lubricant retaining cover for the working members of the universal coupling.

7. In a universal coupling, an endwise movable spindle, coupling sleeves with spherically faced outer edges, yielding segmental collars adapted for sliding contact thereon, chambers formed on the segmental collars, springs housed in said chambers and co-acting with said spindle, coupling sleeves and segmental collars to endwise equilibrate said spindle and to cause said segmental collars to slidably engage said coupling sleeves and form therewith dust proof lubricant retaining covers for the working members of the universal joint.

8. In a universal coupling, an endwise movable spindle adapted to slidably engage the bifurcated coupling heads of a driving rotating element and a driven rotating element adjustable thereto with reference to its axial alinement, coupling sleeves provided with a spherically faced outer edge, segmental collars slidably mounted on said spindle and provided with chambers, helical springs mounted in said chambers and adapted to co-act with said spindle, coupling sleeves and segmental collars so as to endwise equilibrate said spindle and to hold said segmental collars in slidable contact with said coupling sleeves, thereby forming a dust proof lubricant retaining coupling.

9. In a universal coupling, a driving rotating element, a driven rotating element, adjustable thereto with reference to its axial alinement, an endwise movable spindle provided with a telescopic universal joint at each end, said spindle adapted to be held in endwise equilibrium by yielding spherically faced segmental collars adapted to be held in sliding contact with said coupling sleeves and forming therewith dust proof lubricant retaining covers for the working members of the universal joint.

10. In a universal coupling, the combination of a driving rotating element, provided with a bifurcated coupling head, a driven rotating element provided with a bifurcated coupling head, said driven rotating element adjustable to said driving rotating element with reference to its axial alinement, slippers contained in said coupling heads, an endwise movable spindle adapted to telescopically engage said coupling heads, coupling sleeves closely fitting said coupling heads and provided with a spherical outer face, segmental collars provided with an interior spherical face adapted to abut against the spherical outer face of said coupling sleeves, springs contained in chambers formed on said segmental collars and adapted to cause said segmental collars to slidably engage said coupling sleeves, thereby holding said spindle in endwise equilibrium and forming a dust proof lubricant retaining coupling.

11. In a universal coupling, an endwise movable spindle, a spring sustained dust proof, lubricant retaining cover comprising a coupling sleeve and a segmental collar slidably mounted on said spindle and adapted to sliding contact with said coupling sleeve thereby holding said spindle in endwise equilibrium.

In witness whereof I hereunto affix my signature.

HARRY R. GEER.